United States Patent [19]
Fuchs et al.

[11] Patent Number: 5,091,230
[45] Date of Patent: Feb. 25, 1992

[54] TUBE OF COMPOSITE MATERIAL WITH A FIBROUS THERMOPLASTIC COATING AND PROCESS FOR MANUFACTURING SUCH A TUBE

[75] Inventors: Jean-François Fuchs, Sainte-Helene; Jean-Louis Tisne, Martignas; Pierre Odru, Fontenay Sous Bois, all of France

[73] Assignees: Aerospatiale Societe Nationale Industrielle, Paris; Institut Francais du Petrole, Malmaison, both of France

[21] Appl. No.: 508,197

[22] Filed: Apr. 12, 1990

[30] Foreign Application Priority Data

Apr. 13, 1989 [FR] France ................................ 89 04898

[51] Int. Cl.$^5$ ............................................ F16L 17/02
[52] U.S. Cl. ................................ 428/36.4; 428/34.7; 428/35.7; 428/36.3; 428/36.8; 428/36.91; 428/267; 138/137; 138/172; 138/174; 138/145; 138/146; 138/125; 138/DIG. 2
[58] Field of Search ............... 428/36.4, 34.7, 35.7, 428/36.3, 36.8, 56.91, 267; 138/137, 172, 174, 145, 146, 125, DIG. 2

[56] References Cited

U.S. PATENT DOCUMENTS

| | | | |
|---|---|---|---|
| 3,843,759 | 10/1974 | Keeham | 264/135 |
| 4,532,169 | 7/1985 | Carley | 428/109 |
| 4,903,735 | 2/1990 | Delacour et al. | 138/133 |

FOREIGN PATENT DOCUMENTS

0133340  2/1985  European Pat. Off.
2077880 12/1981  United Kingdom .

Primary Examiner—Ellis P. Robinson
Assistant Examiner—J. Weddington
Attorney, Agent, or Firm—Armstrong, Nikaido, Marmelstein, Kubovcik & Murray

[57] ABSTRACT

The tube, composed of a structural portion (1) of composite fibers encapsulated with thermosetting matrixes playing the part of a binder and obtained by filament winding, is provided with at least one inner coating (2) of a fibrous composite material impregnated with a thermoplastic binder, which is directly adjacent to the tubular portion formed by the structural portion (1) with the thermosetting binder.

Application to oil production tubings.

2 Claims, 1 Drawing Sheet

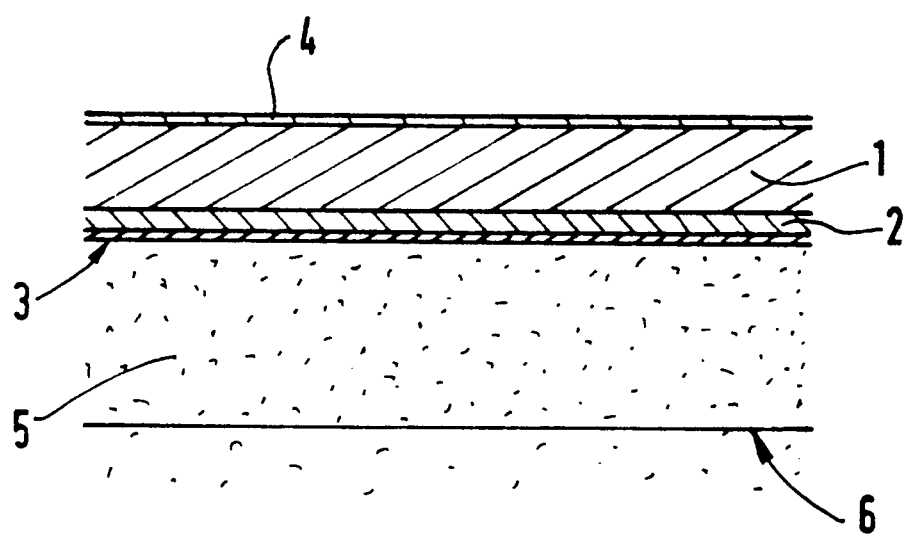

TUBE OF COMPOSITE MATERIAL WITH A FIBROUS THERMOPLASTIC COATING AND PROCESS FOR MANUFACTURING SUCH A TUBE

The invention relates to a tube made of fibrous composite material with a thermosetting binder, and it relates more especially to a tube provided with a fibrous thermoplastic inner coating and its manufacturing process, in particular for application to oil production tubings functioning at any pressure level.

In this particular field, the tubes used are habitually produced by winding fibers, for example Aramide, glass or carbon fibers, encapsulated with thermosetting matrixes such as epoxy resin. In order to be tight at high internal pressures in the order of 350 bar in service, these tubes have to be internally encapsulated with a layer of product that ensures tightness. At the present time, composite tubes are provided with an elastomer inner coating; however, for the purpose of transporting crude oil or gas, this has the major drawback of having a generally very limited useful life when it is in the presence of gas, such as hydrosulfuric acid, $H_2S$, quite a considerable proportion of which, as we know, can be present in crude oils. These presently known elastomer coatings thus have to be replaced by materials that have little or no sensitivity to petroleum effluents and use is thus made, through lack of suitable elastomers, of polyamide coatings that are thermoplastic and thus have to be put into place on the inner face of a tube of composite material constituted by fibers bound by a thermosetting matrix.

A first method used for putting them into place is to insert a sheath of pure polyamide inside the tube of composite material after the latter has been produced. However, this operation is very difficult given the length of the sections of tube currently used in the oil industry (up to twenty yards or so), all the more in that this sheath has to be perfectly bonded to the structural composite material. Furthermore, polyamide must not be supplied in liquid or powder form given that such a process necessitates heating up to a temperature in the order of 200° C., which is incompatible with the support constituted by the composite with the thermosetting matrix. Finally, this process would necessitate tools for supplying the thermoplastic material having a length at least equal to half that of the tubing.

A second method, which is the opposite of the previous one, is to place the tubing, this time, over a tubular sheath of pure polyamide (Rilsan, for example), previously fitted over a mandrel, by filament winding fibers (glass, Aramide or carbon) to form the said tubing.

This process has two drawbacks.

On one hand, it is difficult to fit a thin, hence fragile, tube over a mandrel that may be as long as 15 yards or more. On the other hand, assuming that a bonding process is sufficient to bond the polyamide sheath to the composite material, such a process would result in the setting up of residual stresses in the sheath such that the latter would be particularly fragile in use.

There is known, moreover, a process for reinforcing a thermoplastic polymer moulded pipe which consists in providing on this pipe a winding of a reinforcing material formed by an armature with flexible filaments but also filaments likewise of thermoplastic polymer, and then in fusing the outer face of the pipe with these thermoplastic filaments of the material. This externally applicable reinforcing technique is suitable for pipes themselves of thermoplastic material, but it cannot be used with thermosetting composites that cannot fuse with thermoplastic filaments.

SUMMARY OF THE INVENTION

The invention also aims to overcome the drawbacks of these known techniques by proposing a solution that makes it possible to bring together the thermosetting materials and the thermoplastic materials ensuring that the coating is maintained, without unbonding, on the mechanically resistant structure of the tube of composite material, both during its manufacture and its use under the particular conditions of application, as mentioned earlier.

The invention thus relates firstly to a tube of composite material essentially composed of a structural portion of fibers encapsulated with thermosetting matrixes playing the part of a binder, a tube wherein the tubular structural portion with a thermosetting binder is provided:

with a first inner coating of a fibrous composite material with a thermoplastic binder the interface fibers of which are closely bonded by polymerization to the binder of the thermosetting portion of this tubular portion and, below this first inner coating, with a second, additional inner coating of thermoplastic material constituted by pure polyamide, bonded to the thermoplastic binder of the said first inner coating. It is also provided for the tubular structural portion with thermosetting binder to have an outer coating of fibrous composite material with a thermoplastic binder, the interface fibers of which are closely bonded by polymerization to the binder of the thermosetting portion of this tubular portion.

Another object of the present invention relates to the process for manufacturing such a tube of composite material, a process whereby fibers impregnated with a thermoplastic polyamide matrix are wound onto a tubular mandrel, heating being provided for the bonding of the matrix, a structural portion of fibers and thermosetting resin then being wound at ambient temperature over this layer and, finally, hot polymerization of the thermosetting matrix is carried out by stoving the assembly.

According to another particular feature of the invention, prior to winding the fibers impregnated with a polyamide matrix, a film of pure polyamide is wound onto the mandrel.

BRIEF DESCRIPTION OF THE DRAWINGS

Further particular features and advantages of the invention will emerge from a study of the following description of a form of embodiment given with reference to the sole FIGURE, which represents a schematic view in partial cross-section of a tube of composite material.

DESCRIPTION OF THE PREFERRED EMBODIMENTS

The figure shows a tube essentially composed of a structural portion 1 of composite fibers encapsulated with thermosetting matrixes playing the part of a binder and by an inner coating 2 of fibrous composite material obtained, for example, by winding on glass fibers, which is impregnated with a thermoplastic binder. This fibrous thermoplastic layer will retain its dimensions of manufacture, thanks to its fiber reinforcement, after the manufacture of the tube. This layer 2 forms inner tubular coating the interface fibers of which are closely bonded by polymerization to the binder of the thermosetting portion of the tubular portion 1 and is located directly adjacent to the tubular portion formed by the structural portion and can withstand the gases given off by the petroleum products and the high pressures to which it is subjected. However, in the case of uses involving very high pressures, in the order of 500 bar, microcracks can develop between the fibers. The tube is thus provided on its inner face, beneath layer 2, with an additional layer 3 of thermoplastic material constituted by pure polyamide and obtained by winding, to which will be bonded the fibers impregnated with the same thermoplastic material constituting layer 2 of fibrous thermoplastic.

According to an alternative form of embodiment, it would also be possible to produce an outer coating of wound polyamide fibers. This outer coating 4 of fibrous composite material with a thermoplastic binder, the interface fibers of which are closely bonded by polymerization to the binder of the thermosetting portion of the tubular portion, is thus placed directly over the structural portion 1 and is easily implemented even in the case of very long tubes; it protects the structural composite material 1 and improves water tightness on the outside. This coating 4 is thus conducive to good conditions of aging for structural composite 1. It further provides efficient protection against shocks To produce such a tube, the procedure is as follows:

The film of pure polyamide 3 is wound around a central tubular metallic mandrel 5 having an axis 6. Fibers 2, for example fibers of glass impregnated with a polyamide (thermoplastic) matrix are then wound over this film, with the help of a winding machine. The cohesion of the fibers stabilizing the coating is ensured by heating and bonding of the binder or the thermoplastic matrix. Advantageously, the fiber, pre-coated with a thermoplastic resin, is heated as it is wound onto the mandrel 5, which is itself heated and rotated by a rotary machine. The heating of the encapsulated fiber causes a softening of the resin, which is bonded to the resin coating the fiber already deposited during the preceding turn.

Then, the structural portion 1 of fibers and thermosetting resin (epoxy resin, for example) is then wound on at ambient temperature over this layer 2 thus obtained.

Finally, the complementary winding of layer 4 is carried out using fibers, for example Kevlar fibers, impregnated with a polyamide matrix. This last operation is again carried with heating to ensure the bonding of the thermoplastic binder.

Once the winding operations have been completed, the assembly is placed in an oven for hot polymerization of the thermosetting material. It should be noted that polymerization of the thermosetting material is carried out at a temperature that is far below the melting temperature of the thermoplastic layer 2. For example, the melting temperature of the thermoplastic is 200° to 220° C., while the polymerization temperature of the thermosetting material is limited to 140° C. to 160° C. for polymerization for 30 hours under pressure. None of the winding operations present any difficulty, moreover, as they are carried out using known filamentary winding techniques.

The filamentary composite with a thermosetting matrix, forming layer 1, is thus polymerized between the two skins formed by layers 2 and 4 made of composites with a thermoplastic matrix. This enclosed polymerization technique has the advantage of ensuring that the tube structure retains a high resin content that is very favorable with regard to aging in a marine environment.

The invention applies in general to the production of any tube necessitating the superposing and efficient bonding of a layer of so-called "thermoplastic" material on a thermosetting material.

We claim:

1. A tube of composite material comprising a tubular structural portion containing fibers encapsulated with thermosetting matrixes functioning as a binder,
    a first inner coating of fibrous composite material with a thermoplastic binder on the interior surface of the tubular structural portion, interface fibers of said first inner coating being closely bonded by polymerization to the thermosetting binder of said tubular structural portion, and
    a second supplementary inner coating on the first inner coating, the second supplementary inner coating of thermoplastic material consisting essentially of polyamide and bonded to the thermoplastic binder of the said first inner coating.

2. A tube of composite material according to claim 1, wherein the tubular structural portion with the thermosetting binder has an outer coating of fibrous composite material with a thermoplastic binder, interface fibers of which are closely bonded by polymerization to the binder of the thermosetting binder of the tubular structural portion.

* * * * *